United States Patent [19]
Henkee et al.

[11] Patent Number: 6,146,574
[45] Date of Patent: *Nov. 14, 2000

[54] ARTICLE MANUFACTURE USING POLYOLEFIN CONTAINING POLYETHERAMINE MODIFIED FUNCTIONALIZED POLYOLEFIN

[75] Inventors: Christopher S. Henkee, Austin; Wheeler C. Crawford, Houston, both of Tex.; Richard J. Clark, Parker, Colo.

[73] Assignee: Huntsman Petrochemical Corporation, Austin, Tex.

[*] Notice: This patent is subject to a terminal disclaimer.

[21] Appl. No.: 09/094,247

[22] Filed: Jun. 9, 1998

Related U.S. Application Data

[63] Continuation-in-part of application No. 08/962,788, Nov. 3, 1997, Pat. No. 5,965,667, and a continuation-in-part of application No. 08/838,970, Apr. 23, 1997, Pat. No. 5,985,999, which is a continuation-in-part of application No. 08/679,070, Jul. 12, 1996, Pat. No. 6,013,048, which is a continuation-in-part of application No. 08/499,521, Jul. 7, 1995, Pat. No. 5,783,630, which is a continuation-in-part of application No. 08/222,508, Apr. 4, 1994, abandoned, which is a continuation-in-part of application No. 08/090,675, Jul. 13, 1993, abandoned, and a continuation-in-part of application No. 08/515,706, Aug. 16, 1995, Pat. No. 5,721,315, which is a continuation of application No. 08/222,508, Apr. 14, 1994, abandoned, which is a continuation of application No. 08/090,675, Jul. 13, 1993, abandoned

[60] Provisional application No. 60/049,225, Jun. 9, 1997, and provisional application No. 60/046,210, May 12, 1997.

[51] Int. Cl.[7] .............................. B29C 43/00; B29C 63/00
[52] U.S. Cl. .................. 264/241; 264/257; 264/271.1; 428/516; 428/523
[58] Field of Search .................. 525/73, 74, 63, 525/69; 264/176.1, 177.1, 211.21, 211.22, 241, 257, 271.1; 8/928, 115.54, 115.55; 428/516, 523

[56] References Cited

U.S. PATENT DOCUMENTS

| | | |
|---|---|---|
| 3,320,226 | 5/1967 | Cappuccio et al. . |
| 3,654,370 | 4/1972 | Yeakey . |
| 4,039,461 | 8/1977 | Hankins et al. . |
| 4,137,185 | 1/1979 | Gardiner et al. . |
| 4,179,164 | 12/1979 | Lausberg et al. . |
| 4,490,494 | 12/1984 | Shropshire . |
| 4,505,834 | 3/1985 | Papay et al. . |
| 4,520,171 | 5/1985 | Diveley et al. . |
| 4,632,769 | 12/1986 | Gutierrez et al. . |
| 4,636,436 | 1/1987 | Clementini et al. . |
| 4,678,834 | 7/1987 | Boivin et al. . |
| 4,710,540 | 12/1987 | McAlpin et al. . |
| 4,753,998 | 6/1988 | Shyu et al. . |
| 4,795,782 | 1/1989 | Lutz et al. . |
| 4,822,668 | 4/1989 | Nogues . |
| 4,822,688 | 4/1989 | Nogues . |
| 4,853,367 | 8/1989 | Henzel et al. . |
| 4,854,631 | 8/1989 | McAlpin et al. . |
| 4,857,595 | 8/1989 | Kazmierzak et al. . |
| 4,861,812 | 8/1989 | McAlpin . |
| 4,902,749 | 2/1990 | Akkapeddi et al. . |
| 4,981,896 | 1/1991 | Okada et al. . |
| 4,994,503 | 2/1991 | Harris et al. . |
| 5,006,601 | 4/1991 | Lutz et al. . |
| 5,010,119 | 4/1991 | McElrath, Jr. et al. . |
| 5,017,658 | 5/1991 | Noma et al. . |
| 5,073,600 | 12/1991 | Gorman et al. . |
| 5,115,018 | 5/1992 | Akkapeddi et al. . |
| 5,130,069 | 7/1992 | Tietz et al. . |
| 5,208,081 | 5/1993 | Gubitz et al. . |
| 5,210,134 | 5/1993 | Akkapeddi et al. . |
| 5,225,483 | 7/1993 | Datta et al. . |
| 5,244,971 | 9/1993 | Jean-Marc . |

(List continued on next page.)

FOREIGN PATENT DOCUMENTS

| | | |
|---|---|---|
| 1184554 | 3/1985 | Canada . |
| 0061889 | 10/1982 | European Pat. Off. . |
| 0367832A1 | 3/1989 | European Pat. Off. . |
| 0634424A1 | 6/1994 | European Pat. Off. . |
| 60195120 | 1/1971 | Japan . |
| 46003838 | 5/1990 | Japan . |
| 2-237943 | 9/1990 | Japan . |
| 7-053812 | 2/1995 | Japan . |
| 2154364 | 10/1985 | United Kingdom . |
| WO93/24938 | 12/1993 | WIPO . |
| WO97/03108 | 1/1997 | WIPO . |

OTHER PUBLICATIONS

Dagli et al., "Process requirements of the reactive compatibilization of Nylon 6/Polypropylene blends," Polymer Processing Institute at Stevens Institute of Technology, Hoboken, NJ.

Callais Kazmierzak, "The Maleic Grafting of Polypropylene with Organic Peroxides," *Compalloy '90*, pp. 361–369 (1990).

International Search Report, Sep. 11, 1998.

REXflex® Flexible PolyOlefins—Customer Focused Solutions—Brochure, Rexene Products, Dallas, TX, pp. 1–10.

*Primary Examiner*—Mark L. Warzel
*Attorney, Agent, or Firm*—O'Keefe, Egan & Peterman LLP

[57] ABSTRACT

This invention concerns a composition comprising a blend of polyolefin with the reaction of a functionalized polyolefin and polyetheramine in which the polyetheramine is grafted into the functionalized polyolefin in a customary mixing apparatus. A process for producing the reaction product of functionalized polypropylene and polyetheramine by melting with polypropylene in a customary mixing apparatus is also disclosed. Blends of the present invention are advantageously useful to prepare paintable automotive body parts. This invention further includes dyeable polyolefin compositions containing the reaction product of functionalized polyolefin and polyetheramine. Dyeable polyolefin fibers, including polypropylene fibers, are disclosed, which may be made by melt spinning, and which may be employed to make woven and non-woven fabric.

21 Claims, No Drawings

U.S. PATENT DOCUMENTS

| | | |
|---|---|---|
| 5,346,951 | 9/1994 | Suwada . |
| 5,358,537 | 10/1994 | Kelly et al. . |
| 5,364,909 | 11/1994 | Guo et al. . |
| 5,369,170 | 11/1994 | Weinkauf . |
| 5,373,048 | 12/1994 | Witzeman et al. . |
| 5,384,375 | 1/1995 | Roberts . |
| 5,393,824 | 2/1995 | Roberts . |
| 5,447,539 | 9/1995 | Kelly et al. . |
| 5,468,259 | 11/1995 | Sheth et al. . |
| 5,576,366 | 11/1996 | Sheth . |
| 5,587,118 | 12/1996 | Mallonee . |

ARTICLE MANUFACTURE USING POLYOLEFIN CONTAINING POLYETHERAMINE MODIFIED FUNCTIONALIZED POLYOLEFIN

This application claims benefit of Provisional Application Ser. No. 60/049,225 filed Jun. 9, 1997, and a provision of Ser. No. 60/046,210 field May 12, 1997, and this is a CIP of Ser. No. 08/962,788 filed Nov. 3, 1997 now U.S. Pat. No. 5,965,667, and a CIP of Ser. No. 08/838,970 filed Apr. 23, 1997 now U.S. Pat. No. 5,985,999, which is a CIP of Ser. No. 08/679,070 filed Jul. 12, 1996 now U.S. Pat. No. 6,031,048 which is a CIP of Ser. No. 08/999,521 filed Jul. 7, 1995 now U.S. Pat. No. 5,783,630, which is a CIP of Ser. No. 08/222,508 filed Apr. 4, 1994 now abandoned, which is a CIP of Ser. No. 08/090,675 filed Jul. 13, 1993 now abandoned, and a CIP of Ser. No. 08/515,706 filed Aug. 16, 1995 now U.S. Pat. No. 5,721,315, which is a con. of Ser. No. 08/222,508 filed Apr. 14, 1994 now abandoned, which is a Con. of Ser. No. 08/090,675 filed Jul. 13, 1993 now abandoned.

BACKGROUND OF INVENTION

This invention relates to a novel olefin polymer composed of the reaction of a functionalized polypropylene and a polyetheramine. This invention also relates to thermoplastic resin blends containing the novel olefin polymer and polypropylene. This invention also relates to dyeable compositions containing polypropylene and the reaction product of functionalized polypropylene and polyetheramine, wherein such compositions may be in the form of fibers. This invention also relates to use of themoplastic blends containing polypropylene and the reaction product of functionalized polypropylene and polyetheramine as either a film backing or molding resin in the manufacture of molded articles of manufacture, such as bumper fascias.

While polypropylene has many other advantageous physical properties, its inherent ability to be dyed is very poor. Indeed, polypropylene has frequently been the ideal choice when a non-dyeable plastic is needed. For years there has been a long felt need for propylene compositions which are dyeable. Notwithstanding substantial efforts to provide dyeable polypropylene, this need remains unmet. This need is particularly acute in the fiber industry.

The most often used technique for obtaining colored polypropylene in fiber form is by addition of solid pigments to the polypropylene. Unfortunately, fibers with solid pigment are not nearly as vibrant as dyed fibers. Also, due to their limited number, pigments offer a significantly reduced spectrum of choices as compared to dyes. Likewise, use of pigments restricts the patterns that can be applied to an article of clothing prepared from polypropylene. Certain pigments, additionally, affect the drawability and final properties of the polypropylene fiber. Other polyolefins such as polyethylene possess similar disadvantages.

In view of the foregoing, it is apparent that a continuing need exists for dyeable polyolefin compositions, including polypropylene compositions.

SUMMARY OF INVENTION

This invention is a compound comprising a blend of polypropylene ("PP") with the reaction product of a functionalized polypropylene and polyetheramine in which the polyether amine has grafted onto the functionalized polypropylene. By grafted it is meant that the amine functionality of the polyetheramine reacts with the anhydride component of the functionalized polypropylene to form a reaction product. For instance, a primary amine will react with a maleic anhydride to form an imide. This invention is also a process for producing the reaction product of the functionalized polypropylene and the polyether amine by melting with polypropylene in customary mixing apparatus such as an extruder. In this regard, the compound blend of this invention may be prepared by reactive extrusion by feeding a polyetheramine, a functionalized polypropylene, and polypropylene into an extruder at temperatures such that the polyetheramine reacts with the functionalized polypropylene to form a reaction product containing, for example, an imide group.

In another respect, this invention is a composition comprising polypropylene, a cross-linked thermoplastic polyolefin vulcanizate, and the reaction product of a functionalized polypropylene and a polyether amine.

In one respect, the compositions of the present invention are useful for preparing molded automotive body parts, including directly paintable thermoplastic polyolefins ("TPO") based, and thermoplastic polyolefin vulcanizates ("TPV") based, automotive body parts.

In yet another respect, this invention is a dyeable composition, comprising: a polyolefin such as polypropylene and the reaction product of a functionalized polyolefin, such as maleated polypropylene, and a polyetheramine in an amount effective to increase the dyeability of the composition relative to polyolefin alone. In one embodiment of this invention, this composition is a fiber. As used herein, a "fiber" refers to a flexible, synthetic, macroscopically homogeneous body having a high ratio of length to width and being small in cross section. These fibers may be produced by any of the processes known in the art, including but not limited to direct profile extrusion, and slit or fibrillated tapes. Hence, it is further contemplated that the compositions of this invention are useful to in the preparation of dyeable fibers including dyeable woven and non-woven polyolefin fibers.

In still another respect, this invention is a process for preparing dyeable fibers, comprising: forming a dyeable composition comprising polyolefin and the reaction product of a functionalized polyolefin and a polyetheramine; and extruding the dyeable composition into fibers.

Applications of the fibers and filaments from the polyether modified polyolefins include, with limitation: woven garments (outerwear and underwear); carpeting; furniture and automobile upholstery, woven industrial fabrics; non-woven absorbents used in diapers, sanitary pads, incontinence pads, spill abatement, and medical absorbent pads; non-woven garments, including disposable medical garments; felts; pressed sheets; geo-textiles; filters (bipolar); packaging materials, including envelopes, and synthetic paper.

In addition, it is contemplated that the polyetheramines will improve the washability of a polyolefin-based textile fabric or non-woven mat. The nonpolar polyolefin tends to hold onto dirt due to the hydrophobic nature of both. The polyetheramine is expected to facilitate detergents to penetrate the fabric or matrix so the detergents can loosen and wash away the dirt and oils.

It is also contemplated that the incorporation of polyetheramines will increase the absorption and wickability of polyolefin textiles and non-wovens. One example is the melt blown, non-woven absorbent in baby diapers. Making the surface of the non-woven filament more hydrophilic by incorporating the polar polyetheramine into the polyolefin is expected to greatly increase the diaper's moisture absorption characteristics.

It is also contemplated that the incorporation of polyetheramines will increase the abrasion resistance of fibers, fabrics, and other articles. Abrasion resistance is important in the drawing of formed fibers. Typically, a sizing is applied to reduce friction between the fiber and the metal surfaces of the drawing system.

It is also contemplated that the compositions are useful for making molded parts that contain filler such as glass. It is yet further contemplated that the compositions of the present invention may be useful in the preparation of films, including packaging films, to eliminate tie layers and to improve printability and barrier properties; and in packaging materials for electronics components such as circuit boards or semiconductor chips, wherein the packaging materials may provide electrostatic dissipation which would thereby protect the components from damage. It is yet further contemplated that the composition of the present invention may be useful to improve the barrier properties for polyethylene and to modify polyethylene as a tie layer in multi-layer films. It is further contemplated that the composition of the present invention may be useful as an additive as polypropylene based reinforcement fibers for concrete. Also, it is contemplated that this invention may be useful for extended coatings for metal or glass substrates, with improved printability and metal, and as packaging films with improved adhesion to metallized layer.

It is yet further contemplated that the composition of the present invention may be useful for dyeable ribbon, paintable foams, antistatic foams, adhesive bondable PP components, and improved substrates for electroplating, such as for electromagnetic interference shielding or decoration.

In some manufacturing processes used in the automotive industry, inserts, liners, or other items are placed into a mold, which become an integral part of the finished product. For example, a film material may be placed inside a mold, and then molding resin (such as TPO based thermoplactice material) is injected to fill the mold to form an article in which the film now becomes the exterior surface of the article. The film material may be colored or decorated in such a way to impart desired characteristics to the exterior of the part. The film may be a laminate including an outside surface with a TPO backing. It has now been found that the polyolefin composition of this invention as either the backing of the film or as the molding resin may enhance the adhesion between the exterior film and the rest of the article of manufacture. This approach may also be used with respect to mold liners and inserts, as well as use of a spray coating in the mold prior to filling. Thus, in another respect, this invention is a process for the manufacture of an article, and articles made therefrom, in which the process comprises placing a film, line, insert, or combination thereof into a mold; and filling the mold with a thermoplastic to form the article of manufacture, wherein the film, liner, insert, or combination thereof has a backing comprising polyolefin and the reaction product of polyetheramine and functionalized polyolefin. In another respect, this invention is a process for the manufacture of an article, and articles made therefrom, in which the process comprises placing a film, liner, insert, or combination thereof into a mold; and filling the mold with a composition comprising polyolefin and the reaction product of polyetheramine and functionalized polyolefin. In another respect, this invention is a process for the manufacture of an article, and articles made therefrom, in which the process comprises placing a film, liner, insert, or combination thereof into a mold; and filling the mold with a composition comprising polyolefin and the reaction product of polyetheramine and functionalized polyolefin; and wherein the film, liner, insert, or combination thereof has a backing comprising polyolefin and the reaction product of polyetheramine and functionalized polyolefin.

The present invention provides a solution to one or more of the disadvantages and needs discussed above. In this regard, this invention surprisingly provides a dyeable polyolefin composition that possesses good tensile strength and processability. It is further expected that this invention provides a polyolefin composition which unexpectedly and advantageously has additional improved properties, including one or more improved properties such as washability, wetability, static retention, bondability to materials such as carpet backings, and flammability.

DETAILED DESCRIPTION OF THE INVENTION

Plastics are increasingly being employed in the production of motor vehicles. Impact modified polypropylene has proved to be particularly suitable for applications such as bumpers, spoilers, fenders, side bump strips and the like. Therefore, a thermoplastic resin blend having the improved properties of the instant invention has significant potential commercial usefulness. These resin compositions, according to the present invention, are useful as engineering plastics which are materials for structural members in the fields of transport machines (automobiles, ships and the like), apparatus, tools, electronic appliances, electric appliances, sporting goods, leisure goods and the like; and for connectors, tubes and the like.

The blend of polypropylene with the reaction product of maleated polypropylene and polyether amine shows improved paintability, improved impact resistance, and excellent mold flowability over blends of polypropylene and maleated polypropylene.

Moreover, polyolefins have been and will continue to be used in the production of fibers and fabrics made therefrom. However, polyolefins are inherently not susceptible to being dyed. A need exists, therefore, for dyeable polyolefins. The blend of polyolefin with the reaction product of a functionalized polyolefin and a polyetheramine provides a solution to this problem. Suitable thermoplastic resin compositions useful in the manufacture of fibers and non-wovens should contain an effective amount of polyetheramine to enhance the dyeability of the composition relative to compositions containing polypropylene alone, or containing only polypropylene and functionalized polypropylene such as maleated polypropylene.

In one embodiment of the present invention, the thermoplastic resin composition may contain up to about 12% by weight polyetheramine and up to about 30% by weight functionalized polyolefin. In particular, the thermoplastic resin composition may contain up to about 8% by weight polyetheramine and up to about 20% by weight functionalized polyolefin. In a preferred embodiment, the thermoplastic resin composition may contain from about 0.1 to about 5% by weight polyetheramine and from about 0.2 to about 15% by weight functionalized polyolefin. In an especially preferred embodiment, the thermoplastic resin composition may contain from about 1 to about 4% by weight polyetheramine and from about 2 to about 12% by weight functionalized polyolefin.

The composition containing polyolefin and the reaction product of functionalized polyolefin and polyetheramine may be further blended with other materials used in making fibers for a variety of end users. For example, the composition can be blended with other polymers such as polyester and polyamide (nylon).

Polyolefins used in this invention are well known. Generally, any polyolefin may be employed in the practice of this invention that can be used to make plastic parts, fibers, and the like as described herein. In general, the polyolefins employed in the practice of this invention have a melt flow index in the range from about 0.7 to about 1500. Representative polyolefins include polypropylene and polyethylene. Polyethylene is a well known material. Polyethylene employed in the practice of this invention can be made by traditional Ziegler-Natta catalysts, metallocene catalysts, or single site geometry catalysts, the latter two being available from Exxon Chemical and The Dow Chemical Company, respectively. Such polyolefins may have other monomers included in the polymers, such as propylene, butylene, and octene. Polypropylenes, likewise, are known from polymer chemistry as are described, for example, in Kunststoff-Handbuch, Volume IV, Polyolefins, edited by R. Vieweg, A. Schley and A. Schwarz. Carol Hanser Verlag, Munich, 1969, and are commercially available, so that no details need be given. One such commercially available polypropylene is available from Amoco Chemical under the name AMOCO 1016 polypropylene.

Functionalized polyolefin is a polyolefin onto which a monomer has been grafted. Any functionalized polyolefin can be employed in the practice of this invention which may react with the polyetheramine and which is generally compatible with a given polyolefin after reaction with the polyetheramine. The usual method of such grafting is by free radical reaction. In the practice of this invention, the functionalized polyolefin is not a copolymer of, for example, maleic anhydride and propylene, where the maleic anhydride moiety is predominantly in the backbone of the copolymer. Representative examples of polyolefins to which a monomer has been grafted include homopolymers and copolymers of various olefins such as ethylene, propylene, butylene, pentene, hexylene, heptene, and octene. Suitable monomers for preparing functionalized polyolefin are, for example, olefinically unsaturated monocarboxylic acids of less than 12 carbon atoms, e.g., acrylic acid or methacrylic acid, and the corresponding tert-butyl esters, e.g., tert-butyl (meth)acrylate, olefinically unsaturated dicarboxylic acids of less than 12 carbon atoms, e.g., fumaric acid, maleic acid, and itaconic acid and the corresponding mono-and/or di-tert-butyl esters, e.g., mono- or di-tert-butyl fumarate and mono- or di-tert-butyl maleate, olefinically unsaturated dicarboxylic anhydrides of less than 12 carbon atoms, e.g., maleic anhydride, sulfo- or sulfonyl-containing olefinically unsaturated monomers of less than 12 carbon atoms, e.g., p-styrenesulfonic acid, 2-(meth)acrylamide-2-methylpropenesulfonic acid or 2-sulfonyl(meth)acrylate, oxazolinyl-containing olefinically unsaturated monomers of less than 12 carbon atoms, e.g., vinyloxazolines and vinyloxazoline derivatives, and epoxy-containing olefinically unsaturated monomers of less than 12 carbon atoms, e.g., glycidyl (meth)acrylate or allyl glycidyl ether. The most preferred monomer for preparing functionalized polyolefin is maleic anhydride. The most preferred polyolefin is polypropylene. Hence, the most preferred functionalized polyolefin is maleated polypropylene. Maleated polypropylene is well known, being manufactured by a number of producers. For example, maleated polypropylene is available from Eastman Chemical under the name EPOLENE E-43.

The functionalized polyolefin used in the practice of this invention may have a wide variety of number average molecular weights. In the practice of this invention, any functionalized polyolefin can be used which reacts with polyetheramines afford a polyolefin fiber that has improved dyeability to both polyolefin alone and a polypropylene functionalized polyolefin blend. When the functionalized polyolefin is used to make dyeable compositions such as used to make fibers, the functionalized polyolefin may have a number of average molecular weight greater than about 3,000 and preferably less than about 50,000. Within this range it is contemplated that certain ranges of molecular weights will yield compositions having the highest dyeability, depending on amounts and type of polyolefin, polyetheramine, as well as other considerations such as processing conditions, spinnability of fibers, and other desired physical properties of the resulting dyeable composition. Thus, in certain embodiments it is expected that lower molecular weight functionalized polyolefin may have superior benefits such as those having number average molecular weights below 10,000 or 20,000. In other contexts, higher molecular weight materials may prove to be more advantageous.

It should be appreciated that the polyolefin can be bonded to one or two monomers when the polyolefin is linear, while more than two monomers might be included when the polyolefin is branched. Typically, one or two monomers are present.

The polyetheramines used in this invention include monoamines, diamines and triamines, having a molecular weight of from about 150 to about 12,000, such chemicals including but not limited to hydroxyl, amine, and aminoalcohol functionalized polyether materials. Preferred polyetheramines have a molecular weight of from about 1,000 to about 3,000. Suitable monoamines include JEFFAME™ M-1000, JEFFAMINE™ M-2070, and JEFFAMINE™ M-2005. Suitable diamines include JEFFAMINE™ ED-6000, JEFFAMINE™ ED-4000, JEFFAMINE™ ED-2001 including XTJ-502 and TXJ-418, JEFFAMINE™ D-2000, JEFFAMINE™ D-4000, JEFFAMINE™ ED-900, JEFFAMINE™ ED-600, and JEFFAMINE™ D-400. Suitable triamines include JEFFAMINE™ ET-3000, JEFFAMINE™ T-3000 and JEFFAMINE™ T-5000. Preferred polyetheramines include JEFFAMINE™ M-2070 and JEFFAMINE™ ED-2001. See the glossary for structures of these polyetheramines. More preferred polyetheramines of the present invention have a molecular weight in the range from about 1500 to about 2000. One especially preferred polyetheramine is a polyether monoamine which contains from about 36 to about 44 ethylene oxide units and from 1 to about 6 propylene oxide units. In one embodiment, such polyether monoamines have a molecular weight in the range from about 2000 to about 2200. In another embodiment, the polyether monoamine contains about 40 to about 43 ethylene oxide units and from about 2.4 to about 3 propylene oxide units. Certain polyether monoamines are of formula:

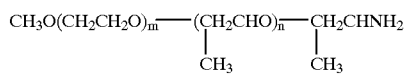

wherein m is about 36 to about 44 and wherein n is about 1 to about 6, including polyether monoamines wherein m is about 40 to about 43 and n is about 2.4 to about 3, as well as compounds of the formula having a molecular weight of about 2000 to about 2200.

In the practice of this invention, monoamines and diamines are preferred. Suitable polyether blocks of the polyetheramine include polyethylene glycol, polypropylene glycol, copolymers of polyethylene glycol and polypropylene glycol, poly(1,2-butylene glycol), and poly(tetramethylene glycol). The glycols can be aminated using well known methods to produce the polyetheramines. Generally, the glycols are prepared from ethylene oxide, propylene oxide or combination thereof using well known methods such as by a methoxy or hydroxy initiated reaction. When both ethylene oxide and propylene oxide are used, the oxides can be reacted simultaneously when a random polyether is desired, or reacted sequentially when a block polyether is desired.

In one embodiment of the present invention, the polyetheramines are prepared form ethylene oxide, propylene oxide or combinations thereof. Generally, when the polyetheramine is prepared from ethylene oxide, propylene oxide or combinations thereof, the amount of ethylene oxide on a molar basis is greater than about 50 percent of the polyetheramine, preferably greater than about 75 percent and more preferably greater than about 90 percent. In one embodiment of this invention, polyols and amines including polyalkylene polyamines and alkanol amines or any amine that is not a polyetheramine is disclosed herein may be absent from the composition. Similarly, functional groups other than ether linkages and amine groups may be absent from the polyetheramine. The polyether amines used in the practice of this invention can be prepared using well known amination techniques such as described in U.S. Pat. No. 3,654,370; U.S. Pat. No. 4,152,353; U.S. Pat. No. 4,618,717; U.S. Pat. No. 4,766,245; U.S. Pat. No. 4,960,942; U.S. Pat. No. 4,973,761; U.S. 5,003,107; U.S. Pat. No. 5,352,835; U.S. Pat. No. 5,422,042; and U.S. Pat. No. 5,457,147. Generally, the polyether amines are made by aminating a polyol, such as a polyether polyol with ammonia in the presence of a catalyst such as a nickel containing catalyst such as a Ni/Cu/Cr catalyst.

The mixing of the functionalized polyolefin and polyetheramine and optionally also polyolefin may be carried out in a customary mixing apparatus including batch mixers, continuous mixers, kneaders, and extruders. For most applications, the mixing apparatus will be an extruder.

The dyeable composition of this invention may be formed into fibers by any number of known methods. Thus, conventional techniques to prepare fibers can be employed, including melt spinning, dry spinning, and wet spinning. As used herein, "spinning" refers to the overall process of polymer dissolution or melting, extrusion, and fiber formation. For example, in melt spinning the dyeable composition described above in molten form is forced through a spinneret (a die) as is used in the art. Size and shape of the spinneret may vary depending on desired denier of the final fiber. The thin jets emerging from the holes in the spinneret are cooled (as by an air quench) to solidify the polymeric composition. Melt spinning is typically conducted at high temperatures such as from 240–310° C. In dry spinning, the dyeable composition is dissolved in a suitable solvent, and the solution is extruded under pressure through a spinneret. The emerging jet from the spinneret is heated to drive off solvent, thereby producing a solid fiber. In wet spinning, the polymer is also dissolved in a solvent, which is forced under pressure through a spinneret which is submerged in a coagulation bath, which causes precipitation of the emerging jet of extruded material.

The filaments exiting the spinneret holes are generally subjected to an air quench, with the filaments being taken up by devices that attenuate the spinline to the desired linear density. These devices collect the spun yarn in a suitable form for further processing. A godet wheel is commonly employed to control take-up velocity, which for example is typically 10–33 meters/second for fine yarns. The yam may be stacked in cans, taken up in bobbins, or directly transferred to drawing and/or texturizing equipment.

The filaments resulting from the melt, dry, or wet spinning process are generally subjected to one or more drawing operations. Thus, the filaments are drawn to achieve an irreversible expansion, thereby inducing molecular orientation with respect to the fiber axis and thereby developing a fiber fine structure. The drawing of polyolefin fibers typically increases orientation and further modifies physical properties of the fiber. Linear density may thus be conveniently reduced during drawing. Drawing can be accomplished in-line with spinning equipment in a conventional, continuous spin-draw process, or in a second processing step. Current melt spinning devices often provide both spinning (extrusion) and drawing in a single high speed process. Likewise, bi-component fibers can be made in side-by-side or skin/core configurations using known apparatus.

The resulting fiber may optionally be modified by texturing, such as by thermochemical annealing. Texturing also provides bulk and softness to articles of manufacture made from the fibers. The fibers can be further processed using known techniques to form yarns having a desired degree of twist to facilitate interfilament cohesion. Similarly, known methods can be employed to disrupt filament alignment and parallelization of continuous filament synthetic fibers to produce yarns generally associated with spun fibers.

The yarn can be manipulated using conventional techniques by weaving or knitting processes to form woven fabric. Additionally, conventional techniques can be employed to produce non-woven fabrics in which the fibers have been bonded chemically, mechanically interlocked, or both. For instance, staple length fibers may be dispersed in a fluid (liquid in wet-laid non-wovens or air for air-laid non-wovens, depending on the technique chosen) and deposited in sheet-like planar form on a support base prior to bonding or interlocking.

The size of the fiber will depend on the end use. For instance, heavier fibers are often employed for carpet backing as opposed to fibers used to make clothing apparel and the like. Later, optionally after additional processing steps such as application of a spin finish, the fibers are drawn.

Conventional methods can be employed to dye the fibers of this invention. For instance, the fibers may be dyed in a dye both using conventional dyes and disperse dye techniques. Generally, the dye is applied in the form of a dye solution so that it can be readily applied by dipping the fiber through a trough, for example, containing the dye solution, or by spraying the dye solution on the fiber, or by using a cascading roll technique. As is common, the dye solution can be in the form of a print paste, from which the dyeing is typically conducted by roller printing or screen printing. The fibers can be dyed multiple times using one or more dyeing techniques.

Aqueous dye baths typically have a pH of from about 2 to about 11, generally between about 2 to about 6 for acid dyes. The pH may be adjusted if desired using a variety of compounds, such as formic acid, acetic acid, sulfamic acid, citric acid, phosphoric acid, nitric acid, sulfuric acid, monosodium phosphate, tetrasodium phosphate, trisodium phosphate, ammonium hydroxide, sodium hydroxide, and combinations thereof. Use of a surfactant can be used to aid in dispersing sparingly water soluble disperse dyes in the dye baths. Typically, nonionic surfactants can be employed for this purpose. During the dying step, the dye bath may be agitated to hasten the dyeing ratio. The dyeing step can be carried out at a variety of temperatures, with higher temperatures generally promoting the rate of dyeing.

Another technique known in the art is jet dyeing, which permits high-temperature dyeing and impingement of the dye onto the moving fabric through use of a venturi jet system. Carriers permit faster dyeing at atmospheric pressure and below 100° C. The carriers are typically organic compounds that can be emulsified in water and that affinity for the fiber. Representative examples of such carriers include aromatic hydrocarbons such as diphenyl and methylnaphthalene, phenols such as phenylphenol, chlorinated hydrocarbons such as dichloro- and tricolor-benzene, and aromatic esters such as methyl salicylate, butyl benzoate, diethylphthalate, and benzaldehyde. Carriers are generally removed after dyeing.

Subsequent to dyeing, using a dye mixture with additives above, dry heat may be applied to the fibers at a wide range of elevated temperatures to cause the dye to penetrate into, and become fixed in, the fiber. The dye fixation step involves exposing the fiber to dry heat, such as in an oven. The temperature can vary up to the melt or glass transition temperature of the composition fiber. Generally, higher drying temperatures result in shorter drying times. Typically, the heating time is from about 1 minute to about 10 minutes. Residual dye may then be removed from the fibers.

A disperse dye mixture may thus be applied to the polypropylene fibers in various ways. The dye mixture may be applied intermittently along the length of yarn formed from fibers using various well known techniques to create a desired effect. One suitable method of dyeing fibers may be referred to as the "knit-deknit" dyeing technique. According to this method, the fibers are formed into a yarn which in turn is knit, typically into a tubing configuration. The dye mixture is then intermittently applied to the knit tubing. After dyeing, the tubing is unraveled and the yarn thus has an intermittent pattern. According to an alternative printing method, the fibers are first formed into yarn which is then woven or knitted into fabric, or is tufted into the carpet. A conventional flat screen printing machine may be used for applying the dye mixture to the fabric or carpet.

Continuous dyeing is carried out on a dyeing range where fabric or carpet is continuously passed through a dye solution of sufficient length to achieve initial dye penetration. Some disperse dyes may be sublimated under heat and partial vacuum into polymer fiber by methods known in the art. Printing of polyolefin compositions made in accordance with this invention can be accomplished with disperse dyes by heat transfer printing under pressure with sufficient heating to cause diffusion or disperse dyes into the polyolefin. Block, flat screen, and heat transfer batch processes, and engraved roller and rotary screen printing continuous processes may be used. Different dye solutions may be jet-sprayed in programmed sequence onto fabric or carpet made of the compositions of this invention as the fabric passes under the jets to form patterns. Dye solution may be metered and broken or cut into a pattern of drops that are allowed to drop on a dyed carpet passing underneath to give a diffuse over-dyed pattern on the carpet. Competitive dyeing of polyolefins is useful when dyeing styled carpets consisting of several different fibers such as nylon, polyester, etc., and a polyolefin. Different styling effects can be produced by controlling shade depth on each type of fiber present. Acid, disperse and premetallized dyes, or combinations thereof, depending upon the fibers present, can be employed to obtain styling effects. It may be possible to produce tweed effects by controlling the amount of reaction product and/or polyetheramine in the dyeable composition. Print dyeing, space dyeing, and continuous dyeing can be carried out with fabrics made from such yarns.

There are many commercially available disperse dyes. Dyes are classified based on method of application and, to a lesser extent, on chemical constitution by the Society of Dyers and Colorists. Various disperse dyes may be found in the listing "Dyes and Pigments by Color Index and Generic Names" set forth in *Textile Chemist and Colorist,* July 1992, Vol. 24, No. 7, a publication of the American Association of Textile Chemists and Colorists.

Dyes are intensely colored substances used for the coloration of various substrates, such as paper, plastics, or textile materials. It is believed that dyes are retained in these substrates by physical absorption, by salt or metal-complex formation, or by the formation of covalent chemical bonds. The methods used for the application of dyes to the substrate differ widely, depending upon the substrate and class of dye. It is by applications methods, rather than by chemical constitutions, that dyes are differentiated from pigments. During the application process, dyes lose their crystal structures by dissolution or vaporization. The crystal structures may in some cases be regained during a later stage of the dyeing process. Pigments, on the other hand, retain their crystal or particulate form throughout the entire application procedure.

A large number of dyes, with widely differing properties, are therefore necessary because of the great variety of materials to be dyed. On a worldwide basis, it is believed that several thousand different dyes have achieved commercial significance. Generally, dyes have been classified into groups two ways. One method of classification is by chemical constitution in which the dyes are grouped according to the chromophore or color giving unit of the molecule. A second method of classification is based on the application class of end-use of the dye. The dual classification system used in the color index (CI) is accepted internationally throughout the dye-manufacturing and dye-using industries. In this system, dyes are grouped according to chemical class with a CI number for each chemical compound and according to usage or application class with a CI name for each dye. Disperse dyes are generally water-insoluble nonionic dyes typically used for dyeing hydrophilic fibers from aqueous dispersion. Disperse dyes have been used on polyester, nylon, and acetate fibers.

A number of spin finishes can be applied to the fibers prior to drawing. Such finishes can be water-based. The spin finishes can be anionic or nonionic, as is well known in the art. Also, the fibers can be finished prior to dyeing, as by texturizing through mechanical crimping or forming, as is well known in the art.

In addition, additives commonly used in this art may be optionally incorporated into the dyeable composition and or fibers. Representative examples of such materials include hydrophilic modifiers such as monoglyceride such as glycerol monostearate, long chain hydrocarbon with hydrophilic groups appended such as a potassium or sodium salt of a linear alkyl phosphate, or combination thereof. The hydrophilic groups may be carboxylates, sulfates, sulfonates, phosphates, phosphonates, as well as quaternary ammonium salts and polyether groups. In addition, swelling agents can be used during dyeing, wetting agent, dye compatibilizers, thickening agents such as various gums. Since polyolefin fibers are often used in outdoor applications, such as outdoor carpeting, the addition of UV stabilizers may be added. Also, antioxidants may be added to the compositions.

Besides the PP/functionalized-PP/polyetheramine structural components according to the invention, the resin compositions may, to improve the impact strength, contain impact modifiers, advantageously impact-modifying elastomers in applications such as for bumper fascias. Impact-modifying elastomers potentially useful for the instant invention are known to a skilled worker. Examples are rubbers based on ethylene, propylene, butadiene, and acrylates, e.g., methacrylates, or mixtures thereof. Other examples include EP and EPDM rubbers, with EP rubber (ethylene propylene rubber) being preferred in applications where automotive body parts are being prepared. A representative example of a currently commercially available EP rubber is sold under the name VISTALON 878 by Exxon Chemical.

Impact-modifying elastomers are described for example in Methoden der organischen Chemie (Houben-Weyl), Volume XIV/1, Makromolekulare Chemie (Georg-Thieme-Verlag, Stuttgart, 1961), pages 390 to 406, and in the monograph by C. B. Bucknal, Toughened Plastics (Applied Publishers, London, 1977).

A composition containing polypropylene and elastomers, such as EP rubber, is commonly referred to as a "TPO," which stands for thermoplastic polyolefin. TPO's are commonly used in the manufacture of molded automotive body parts, such as bumper fascias. Such molded parts may also contain other components such as fillers, as described hereinbelow. TPO-based compositions can be prepared in the same manner as for non-elastomer-containing compositions. TPO's are commonly sold in compound or reactor grades. Representative examples of TPO include those available from Himont under the names HIMONT CA53A and HIMONT LIB15016, and from D & S Plastics International under the name DEXFLEX D-161.

A composition containing polypropylene and vulcanized elastomers (vulcanized rubber), including thermoplastic polyolefin vulcanizates, is commonly referred to as a "TPV." TPV's are commonly used in the manufacture of molded automotive body parts, such as grips and handles. These molded parts may contain other components such as fillers, as described below. TPV-based compositions may be prepared in the same manner as for non-elastomer-containing compositions.

It is contemplated that the polyetheramine and functionalized propylene, and optionally a small amount of PP, TPV, or TPO, can be reacted to form a reaction product concentrate and, later, the reaction product concentrate can be blended with polypropylene or TPO or TPV. In this aspect of the invention, the polyetheramine comprises from about 10 to about 50 weight percent of the concentrate. When the reaction product of polyether amine and maleated PP is prepared neat, the reaction product can be blended or compounded with polypropylene or TPO and any other components of the desired compositions to the desired levels using a mixing apparatus such as an extruder. It should be understood that PP may be commonly used to dilute the reaction. Depending on the type of mixer, the reaction product, polypropylene and any other components can be thoroughly mixed as solids prior to introducing the admixture in the mixing apparatus. Alternatively, mixers are available which will mix the components during operation. In either case, during operation of the mixer, the components are heated to melt the solids, with the melted components being thereafter mixed to form the final composition.

In addition to the structural components of polyolefin, functionalized polyolefin, and polyetheramine and any impact modifier contained in a resin compositions according to the instant invention, the resin may also contain reinforcing agents and/or additives. The reinforcing agents used may be reinforcing fillers, for example, carbon or carbon fibers; clay, chalk, talc, and mica to control shrinkage and control coefficient of thermal expansion; glass (beads, fibers or mats such as of woven fibers) to increase stiffness; and pigments. Further, the fillers may be finished with adhesion promoters and/or sizing agents. In addition, phosphite or hindered phenol or both can be added as a stabilizer (as a free radical scavenger).

When compositions include glass beads or fibers, the composition can contain up to about 40% glass filler if highly stiff compositions are desired. When compositions include glass mats, the composition can contain up to about 80% glass. More typically, from about 2% to about 10% glass filler in the compositions is employed. Advantageously, the compositions of the present invention that contain glass filler generally are substantially free of voids that typically develop in compositions containing polypropylene and glass. While not wishing to be bound by theory, it is believed that the reaction product of polyetheramine and maleated polypropylene serves to "wet" the glass to thereby make the glass and polypropylene more combinable (more miscible). In this aspect of the invention, it is preferred to employ maleated polypropylene having an average molecular weight of about 40,000 to about 60,000, as is described hereinabove. Generally, glass filler and polypropylene are not miscible, and their combination commonly leads to voids in the resulting compositions. The relatively higher molecular weight materials "wet" the glass to make the glass filler particles and polypropylene more combinable to thereby decrease the amount of voids in the resulting compositions.

Suitable thermoplastic resin compositions for use in applications such as for automotive bumper fascias may contain from about 66 to about 80 wt % TPO or TPV, from about 5 to about 30 wt % maleated PP and from about 2 to about 10 wt % polyetheramine. When the compositions include elastomers, such as in TPO-based compositions used to make automotive body parts, or TPV based compositions, the compositions generally comprise from about 5 to about 40% wt maleated TPO or TPV, from about 2 to about 10 wt % polyetheramine and from about 50 to about 93 wt % PP, such as percentages based on the weights of these components of the composition. Preferred compositions that include elastomers, or which are TPV-based, comprise about 15 to about 30 wt % maleated PP, from about 2 to about 8 wt % polyetheramine and from about 62 to about 83 wt % TPO or TPV.

The preferred customary mixing apparatus is an extruder in which the polyetheramine is grafted onto the functionalized polyolefin at from about 175 to 300° C. in the course of a residence time of from about 25 to 300 seconds. For typical compositions of this invention, degradation begins to occur above this temperature range and below this range the compositions generally do not melt. Polypropylene is a non-reactive component of the mixing blend. The preferred temperature range is from about 190 to 260° C. Excess moisture in the blended compositions may cause surface blemishes upon molding, but the moisture can be removed by the normal drying processes, including the use of heated, dry air.

Molded articles prepared from compositions according to the present invention, aside from dyeable compositions and fibers, are generally directly paintable. Representative examples of paints commonly employed for this purpose include urethane-based and melamine-based paints. Such paints may be applied using conventional techniques. Advantageously, compositions of the present invention may be painted directly without solvent borne chlorinated polyethylene pretreatment and optionally without primer, though a primer may be used.

In the examples, continuous compounding is carried out in a Werner & Pfleiderer 30 mm twin screw extruder (ZSK30), having a nine barrel configuration, three kneading zones and one vent section, in which the feed sequence was a combined feed in which all the components fed at the same location (hopper of the extruder).

The following examples illustrate the instant invention but are not intended to limit the scope of the invention or claims thereof. In the examples, a stoichiometric excess of maleic functionality on the maleated polypropylene and maleated polyethylene is used relative to the amount of amine functionality on the polyetheramine.

EXAMPLES 1–26

In Examples 1–26, polyolefins, maleated polypropylene, and polyetheramine are compounded to produce a polyolefin blend that is melt spun to produce polyolefin fibers having improved and unexpected results, including improved dyeability. Table 1 shows the amount and type of polyolefin and the amounts of polyetheramine and maleated polypropylene which is compounded and melt spun.

TABLE 1

| Run | Polyolefin Type | Polyolefin wt % | Polyetheramine wt % | Maleated PP wt % |
|---|---|---|---|---|
| 1 | PP | 98.7 | 0.5 | 0.8 |
| 2 | PP | 97.5 | 1 | 1.5 |
| 3 | PP | 96.2 | 1.5 | 2.3 |
| 4 | PP | 95 | 2 | 3 |
| 5 | PP | 93.7 | 2.5 | 3.8 |
| 6 | PP | 92.5 | 3 | 4.5 |
| 7 | PP | 91.2 | 3.5 | 5.3 |
| 8 | PP | 90 | 4 | 6 |
| 9 | PP | 88.7 | 4.5 | 6.8 |
| 10 | PP | 87.5 | 5 | 7.5 |
| 11 | PP | 85 | 6 | 9 |
| 12 | PP | 82.5 | 7 | 10.5 |
| 13 | PP | 80 | 8 | 12 |
| 14 | PE | 98.7 | 0.5 | 0.8 |
| 15 | PE | 97.5 | 1 | 1.5 |
| 16 | PE | 96.2 | 1.5 | 2.3 |
| 17 | PE | 95 | 2 | 3 |
| 18 | PE | 93.7 | 2.5 | 3.8 |
| 19 | PE | 92.5 | 3 | 4.5 |
| 20 | PE | 91.2 | 3.5 | 5.3 |
| 21 | PE | 90 | 4 | 6 |
| 22 | PE | 88.7 | 4.5 | 6.8 |
| 23 | PE | 87.5 | 5 | 7.5 |
| 24 | PE | 85 | 6 | 9 |
| 25 | PE | 82.5 | 7 | 10.5 |
| 26 | PE | 80 | 8 | 12 |

EXAMPLES 27–52

In Examples 27–52, polyolefins, maleated polyethylene, and polyetheramine are compounded to produce a polyolefin blend that is melt spun to produce polyolefin fibers having improved and unexpected results, including improved dyeability. Table 2 shows the amount and type of polyolefin and the amounts of polyetheramine and maleated polypropylene which is compounded and melt spun.

TABLE 2

| Run | Polyolefin Type | Polyolefin wt % | Polyetheramine wt % | Maleated PE wt % |
|---|---|---|---|---|
| 27 | PP | 98.7 | 0.5 | 0.8 |
| 28 | PP | 97.5 | 1 | 1.5 |
| 29 | PP | 96.2 | 1.5 | 2.3 |
| 30 | PP | 95 | 2 | 3 |
| 31 | PP | 93.7 | 2.5 | 3.8 |
| 32 | PP | 92.5 | 3 | 4.5 |
| 33 | PP | 91.2 | 3.5 | 5.3 |
| 34 | PP | 90 | 4 | 6 |
| 35 | PP | 88.7 | 4.5 | 6.8 |
| 36 | PP | 87.5 | 5 | 7.5 |
| 37 | PP | 85 | 6 | 9 |
| 38 | PP | 82.5 | 7 | 10.5 |
| 39 | PP | 80 | 8 | 12 |
| 40 | PE | 98.7 | 0.5 | 0.8 |
| 41 | PE | 97.5 | 1 | 1.5 |
| 42 | PE | 96.2 | 1.5 | 2.3 |
| 43 | PE | 95 | 2 | 3 |
| 44 | PE | 93.7 | 2.5 | 3.8 |
| 45 | PE | 92.5 | 3 | 4.5 |
| 46 | PE | 91.2 | 3.5 | 5.3 |
| 47 | PE | 90 | 4 | 6 |
| 48 | PE | 88.7 | 4.5 | 6.8 |
| 49 | PE | 87.5 | 5 | 7.5 |
| 50 | PE | 85 | 6 | 9 |
| 51 | PE | 82.5 | 7 | 10.5 |
| 52 | PE | 80 | 8 | 12 |

GLOSSARY

JEFFAMINE™ M-1000

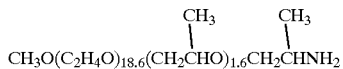

$$CH_3O(C_2H_4O)_{18.6}(CH_2CHO)_{1.6}CH_2CHNH_2$$
with $CH_3$ groups on the $(CH_2CHO)$ and terminal $CH$ carbons.

JEFFAMINE™ M-2070 and JEFFAMINE™ M-2005

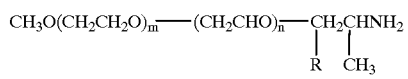

$$CH_3O(CH_2CH_2O)_m\text{---}(CH_2CHO)_n\text{---}CH_2CHNH_2$$
with R and $CH_3$ substituents.

where R=H or $CH_3$, m is from about 3 to 32, and n is from about 10 to 32.

JEFFAMINE™ D-2000, JEFFAMINE™ D-4000 and JEFFAMINE™ D-400

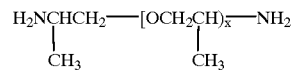

$$H_2NCHCH_2\text{---}[OCH_2CH]_x\text{---}NH_2$$
with $CH_3$ substituents.

where x is about 33 for D-2000, x is about 68 for D-4000 and x is about 5.6 for D-400.

JEFFAMINE™ ED-600, JEFFAMINE™ ED-900, JEFFAMINE™ ED-2001, JEFFAMINE™ ED-4000, and JEFFAMINE™ ED-6000

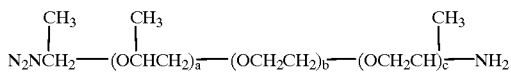

$$N_2NCH_2\text{---}(OCHCH_2)_a\text{---}(OCH_2CH_2)_b\text{---}(OCH_2CH)_c\text{---}NH_2$$
with $CH_3$ substituents.

where b is about 8.5 and a+c is about 2.5 for ED-600, b is about 15.5 and a+c is about 2.5 for ED-900, b is about 40.5 and a+c is about 2.5 for ED-2001, b is about 86.0 and a+c is about 2.5 for ED-4000, and b is about 132.0 and a+c is about 3.0 for ED-6000.

JEFFAMINE™ T-3000 and JEFFAMINE™ T-5000

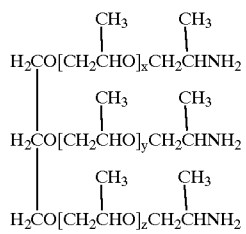

where x+y+z=50 for T-3000 and x+y+z=83 for T-5000.
JEFFAMINE™ ET-3000

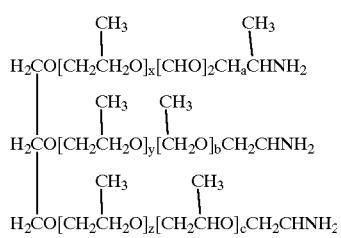

where x+y+z=57 and a+b+c=4.

What is claimed is:

1. A process for the manufacture of an article, comprising:

placing a film, line, insert, or combination thereof into a mold; and filling the mold with a thermoplastic to form the article of manufacture, wherein the film, liner, insert, or combination thereof has a backing comprising a polyolefin and the reaction product of polyetheramine and functionalized polyolefin.

2. The process of claim 1, wherein the polyolefin is polypropylene or polyethylene.

3. The process of claim 1, wherein the polyolefin is polypropylene.

4. The process of claim 1, wherein the polyetheramine is a monoamine or a diamine, and wherein the polyetheramine has a molecular weight of from about 1,000 to about 3,000.

5. The process of claim 1, wherein the functionalized polyolefin is maleated polypropylene.

6. The process of claim 1, wherein the functionalized polyolefin is maleated polypropylene having a number average molecular weight below about 20,000.

7. The process of claim 1, wherein the functionalized polyolefin is present in an amount of from about 0.1% by weight to about 15% by weight; and wherein the polyetheramine is present in an amount of from about 0.5% by weight to about 25% by weight.

8. A process for the manufacture of an article, comprising:

placing a film, liner, insert, or combination thereof into a mold; and filling the mold with a composition comprising polyolefin and the reaction product of polyetheramine and functionalized polyolefin.

9. The process of claim 8, wherein the polyolefin is polypropylene or polyethylene.

10. The process of claim 8, wherein the polyolefin is polypropylene.

11. The process of claim 8, wherein the polyetheramine is a monoamine or a diamine, and wherein the polyetheramine has a molecular weight of from about 1,000 to about 3,000.

12. The process of claim 8, wherein the functionalized polyolefin is maleated polypropylene.

13. The process of claim 8, wherein the functionalized polyolefin is maleated polypropylene having a number average molecular weight below about 20,000.

14. The process of claim 8, wherein the functionalized polyolefin is present in an amount of from about 0.1% by weight to about 15% by weight; and wherein the polyetheramine is present in an amount of from about 0.5% by weight to about 25% by weight.

15. A process for the manufacture of an article, comprising:

placing a film, liner, insert, or combination thereof into a mold; and filling the mold with a composition comprising polyolefin and the reaction product of polyetheramine and functionalized polyolefin;

wherein the film, liner, insert, or combination thereof has a backing comprising polyolefin and the reaction product of polyetheramine and functionalized polyolefin.

16. The process of claim 15, wherein the polyolefin is polypropylene or polyethylene.

17. The process of claim 15, wherein the polyolefin is polypropylene.

18. The process of claim 15, wherein the polyetheramine is a monoamine or a diamine, and wherein the polyetheramine has a molecular weight of from about 1,000 to about 3,000.

19. The process of claim 15, wherein the functionalized polyolefin is maleated polypropylene.

20. The process of claim 15, wherein the functionalized polyolefin is maleated polypropylene having a number average molecular weight below about 20,000.

21. The process of claim 15, wherein the functionalized polyolefin is present in an amount of from about 0.1% by weight to about 15% by weight; and wherein the polyetheramine is present in an amount of from about 0.5% by weight to about 25% by weight.

* * * * *